(12) United States Patent
Bach

(10) Patent No.: US 10,330,324 B2
(45) Date of Patent: Jun. 25, 2019

(54) APPLIANCE AND ILLUMINATED KNOB ASSEMBLY

(71) Applicant: Haier US Appliance Solutions, Inc., Wilmington, DE (US)

(72) Inventor: James Carter Bach, Westfield, IN (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 245 days.

(21) Appl. No.: 15/451,513

(22) Filed: Mar. 7, 2017

(65) Prior Publication Data
US 2018/0259188 A1  Sep. 13, 2018

(51) Int. Cl.
*F24C 7/08* (2006.01)
*F21V 5/04* (2006.01)
(Continued)

(52) U.S. Cl.
CPC .......... *F24C 7/082* (2013.01); *F21V 5/04* (2013.01); *F21V 11/00* (2013.01);
(Continued)

(58) Field of Classification Search
CPC .......... F21V 33/0044; F21V 11/00; F21W 2131/307; F24C 7/082; F24C 3/124; F24C 5/16; G02B 6/0011
(Continued)

(56) References Cited

U.S. PATENT DOCUMENTS 4,052,591 A * 10/1977 Sekera, Jr. ........... H01H 19/025
219/506
4,404,823 A * 9/1983 Miller ................ E05B 37/0003
70/332
(Continued)

FOREIGN PATENT DOCUMENTS

DE  4310340 C1 * 4/1994 ............ F24C 7/082
EP  0176817 A1 * 4/1986 ............ G05G 1/087
(Continued)

OTHER PUBLICATIONS

"EP_176817_A1_M—Machine Translation.pdf", machine translation, EPO, Jan. 1, 2019 (Year: 2019).*

*Primary Examiner* — Gregory L Huson
*Assistant Examiner* — Daniel E Namay
(74) *Attorney, Agent, or Firm* — Dority & Manning, P.A.

(57) ABSTRACT

An appliance and illuminated knob assembly. The knob assembly may include a surface defining an aperture, a stationary shutter fixed relative to the surface, a light source, and a control knob. The light source may be positioned below the surface and directed toward the aperture. The control knob may define a light-transmissive portion above the surface. Moreover, the control knob may be disposed above the stationary shutter and independently rotatable relative to the aperture. The control knob may be rotatable about a rotation axis between a first position and a second position. The first position may include a light-transmissive portion circumferentially aligned with the shutter to restrict light therethrough. The second position may include the light-transmissive portion circumferentially offset from the shutter to permit light from the light source to pass through the light-transmissive portion.

20 Claims, 8 Drawing Sheets

(51) Int. Cl.
*F21V 33/00* (2006.01)
*F21V 8/00* (2006.01)
*F21V 11/00* (2015.01)
*F24C 3/12* (2006.01)
*F24C 5/16* (2006.01)
*F21W 131/307* (2006.01)

(52) U.S. Cl.
CPC ........ *F21V 33/0044* (2013.01); *G02B 6/0011* (2013.01); *F21W 2131/307* (2013.01)

(58) Field of Classification Search
USPC .............................. 126/213, 42, 39 BA, 39 G
See application file for complete search history.

(56) References Cited

U.S. PATENT DOCUMENTS

| | | | |
|---|---|---|---|
| 6,571,727 B2 | 6/2003 | Gjerde | |
| 10,162,436 B2* | 12/2018 | Goss | G06F 3/0362 |
| 2012/0012721 A1* | 1/2012 | Baier | G05G 1/10 |
| | | | 248/224.7 |
| 2012/0243253 A1* | 9/2012 | Claprood | F24C 7/082 |
| | | | 362/555 |
| 2014/0047944 A1* | 2/2014 | Camli | F24C 3/126 |
| | | | 74/553 |
| 2014/0056022 A1* | 2/2014 | Camli | F24C 7/082 |
| | | | 362/551 |
| 2014/0208958 A1* | 7/2014 | Porraro | F24C 3/12 |
| | | | 99/344 |
| 2014/0315510 A1* | 10/2014 | Heng | H01H 19/14 |
| | | | 455/347 |
| 2015/0299929 A1* | 10/2015 | Yang | D06F 39/005 |
| | | | 362/23.1 |
| 2015/0299930 A1* | 10/2015 | Yang | F21V 23/005 |
| | | | 362/23.11 |
| 2015/0315737 A1* | 11/2015 | Yang | F21V 33/0044 |
| | | | 362/23.04 |
| 2016/0320040 A1* | 11/2016 | Kang | H05B 33/0842 |
| 2017/0307206 A1* | 10/2017 | Yantis | G02B 6/0001 |
| 2018/0010932 A1* | 1/2018 | Bach | G01D 5/3473 |
| 2018/0232001 A1* | 8/2018 | Gur | F24C 7/082 |
| 2018/0238556 A1* | 8/2018 | Kozinski | G02B 6/0096 |
| 2018/0240624 A1* | 8/2018 | Fleissner | H01H 19/14 |
| 2018/0245795 A1* | 8/2018 | Serabatir | F24C 3/124 |

FOREIGN PATENT DOCUMENTS

| | | | |
|---|---|---|---|
| EP | 0620406 A2 * | 10/1994 | ............. F24C 3/124 |
| EP | 0611151 B1 | 8/1997 | |
| WO | WO1994001881 A1 | 1/1994 | |
| WO | WO2013041518 A1 | 3/2013 | |

* cited by examiner

APPLIANCE AND ILLUMINATED KNOB ASSEMBLY

FIELD OF THE INVENTION

The present subject matter relates generally to control knobs on an appliance, such as a cooking appliance. More particularly, the present subject matter relates to an improved assembly for illuminating control knobs.

BACKGROUND OF THE INVENTION

Knobs are commonly used on a variety of commercial and residential appliances to control an operating condition of the appliance. Knobs are particularly common on cooking appliances, such as stoves or cooktops (also known as ranges or hobs, respectively). Various shapes and sizes can be used depending upon e.g., the intended application, aesthetics, and other factors.

For example, cooktops traditionally have at least one heating element positioned at a cooktop surface for use in heating or cooking an object, such as a cooking utensil, and its contents. The at least one heating element may heat a cooking utensil directly through induction heating, or may use another heat source such as electrically resistant coils or gas burners. In gas burner cooktops, air is required for the combustion of the gas fuel. For that reason, some gas burner cooktops have air intake openings to allow for a sufficient amount of air intake to meet the combustion requirements of the gas burners. These openings are sometimes located beneath the knobs. When this is the case, some gas cooktops have a light source installed below air intake openings located underneath the knobs so that the light may shine through the openings and communicate certain conditions to the user, such as e.g., whether the knob is in an "on" position.

Certain challenges exist with this construction, however. Such construction, for example, does not use light emitted through the openings to communicate rotation of the control knob. As such, this construction cannot rely upon light to provide indicia regarding movement or position of the control knob.

Accordingly, an improved control knob assembly that uses light to indicate movement and position of the control knob would be beneficial. In particular, it would be advantageous to provide an improved knob assembly that provides variable illumination to a predetermined visual region while limiting light projected from other regions of the knob assembly (i.e., as bleed lighting).

BRIEF DESCRIPTION OF THE INVENTION

Aspects and advantages of the invention will be set forth in part in the following description, or may be obvious from the description, or may be learned through practice of the invention.

In one aspect of the present disclosure, a knob assembly for an appliance is provided. The knob assembly may include a surface defining an aperture, a stationary shutter fixed relative to the surface, a light source, and a control knob. The light source may be positioned below the surface and directed toward the aperture. The control knob may define a light-transmissive portion above the surface. Moreover, the control knob may be disposed above the stationary shutter and independently rotatable relative to the aperture. The control knob may be rotatable about a rotation axis between a first position and a second position. The first position may include a light-transmissive portion circumferentially aligned with the shutter to restrict light therethrough. The second position may include the light-transmissive portion circumferentially offset from the shutter to permit light from the light source to pass through the light-transmissive portion.

In another aspect of the present disclosure, a cooktop appliance is provided. The cooktop appliance may include a cooktop surface defining an aperture, a burner disposed within the cooktop surface, and a knob assembly. The knob assembly may include a stationary shutter fixed relative to the cooktop surface, a light source, and a control knob. The light source may be positioned below the surface and directed toward the aperture. The control knob may define a light-transmissive portion above the cooktop surface. Moreover, the control knob may be disposed above the stationary shutter and independently rotatable relative to the aperture. The control knob may be rotatable about a rotation axis between a first position and a second position. The first position may include a light-transmissive portion circumferentially aligned with the shutter to restrict light therethrough. The second position may include the light-transmissive portion circumferentially offset from the shutter to permit light from the light source to pass through the light-transmissive portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
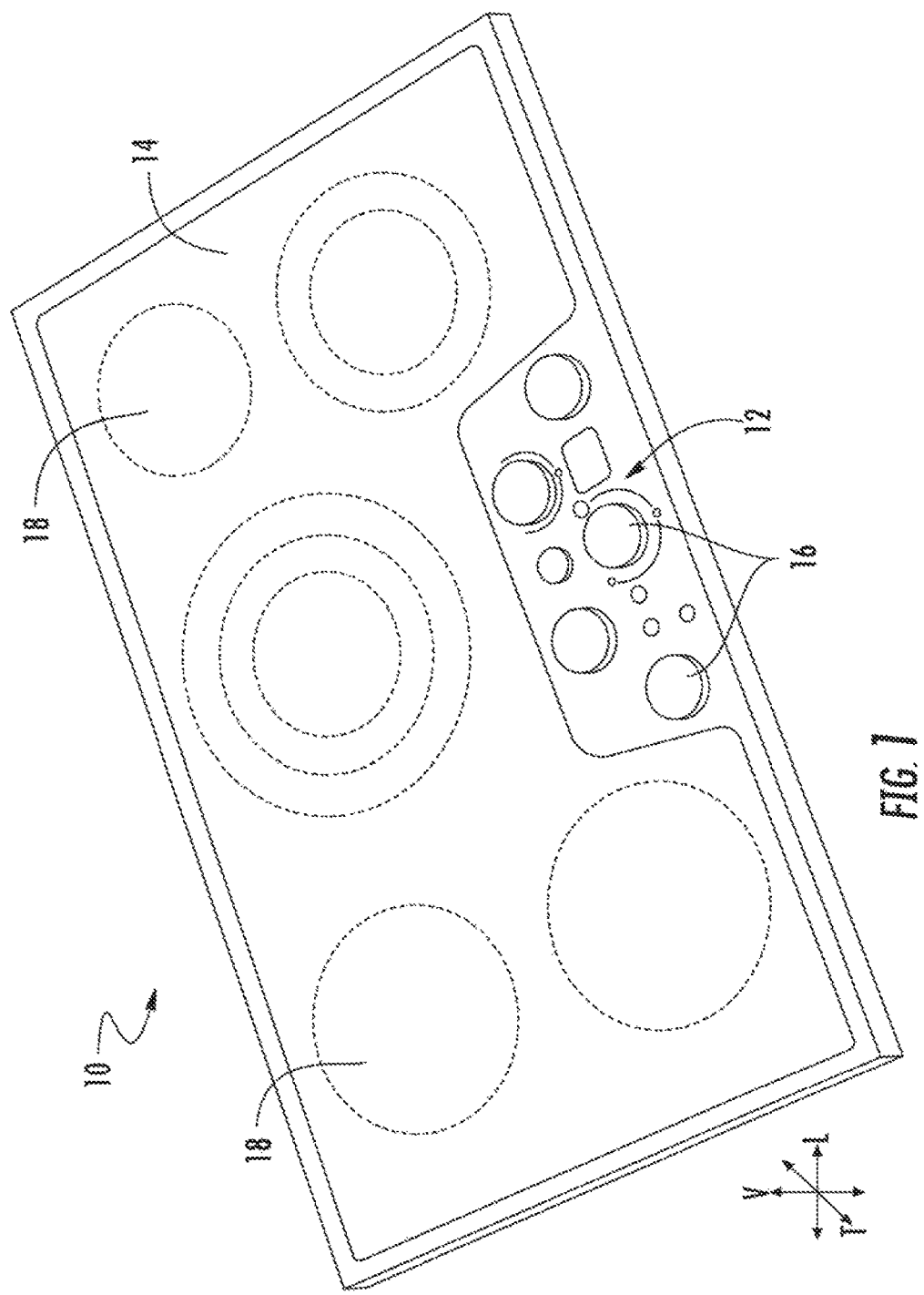
FIG. 1 provides a perspective view of a cooking appliance according to example embodiments of the present disclosure.
Figure 2:
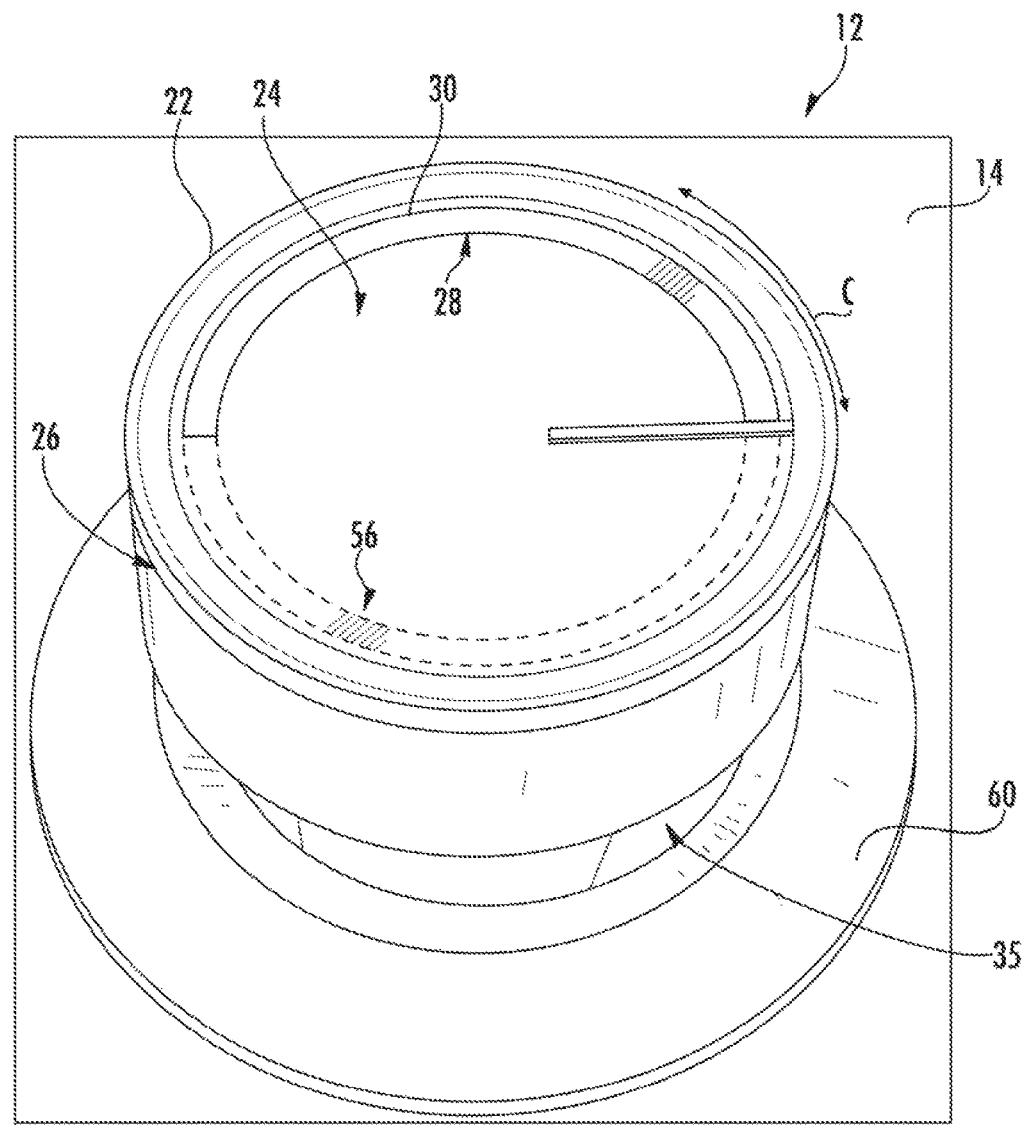
FIG. 2 provides a perspective view of a knob assembly according to example embodiments of the present disclosure.
Figure 3:
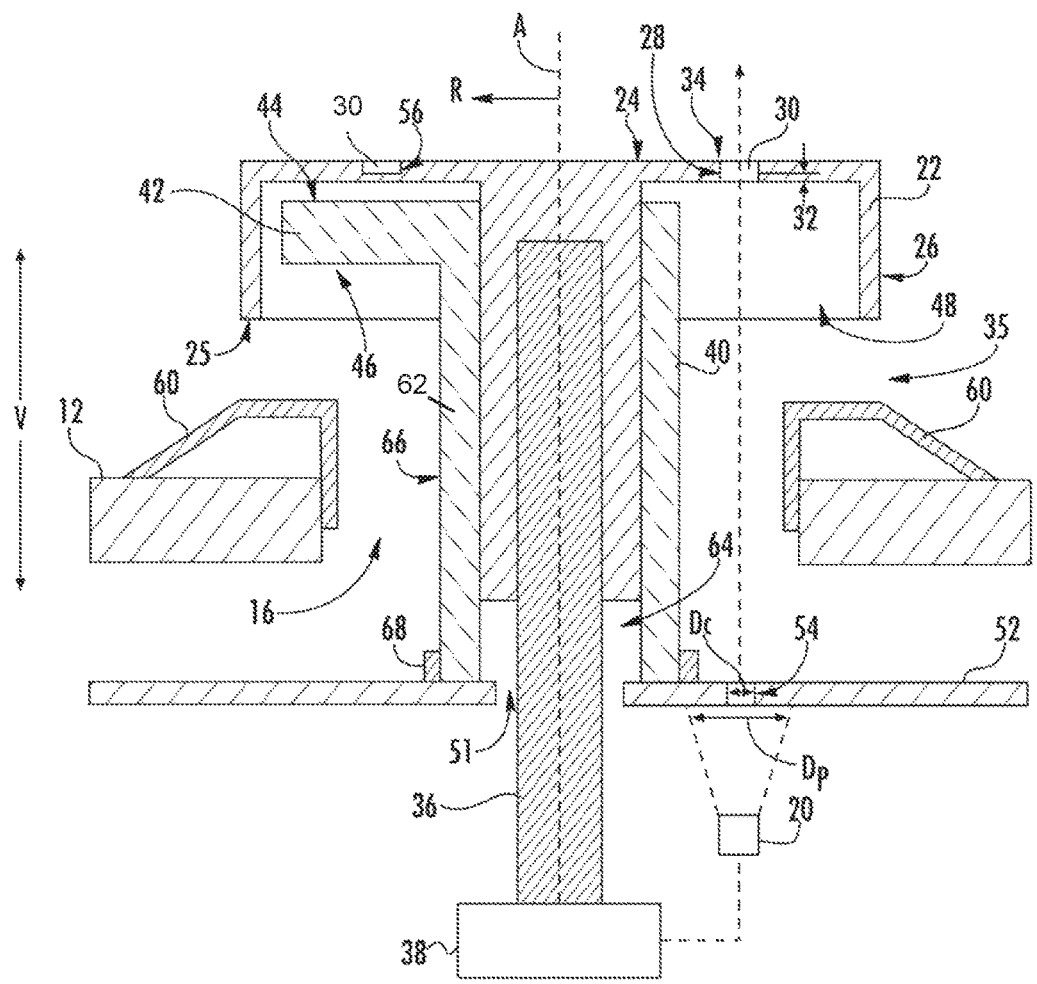
FIG. 3 provides a cross-sectional schematic view of the example knob assembly of FIG. 2 as mounted to an appliance.
Figure 4:
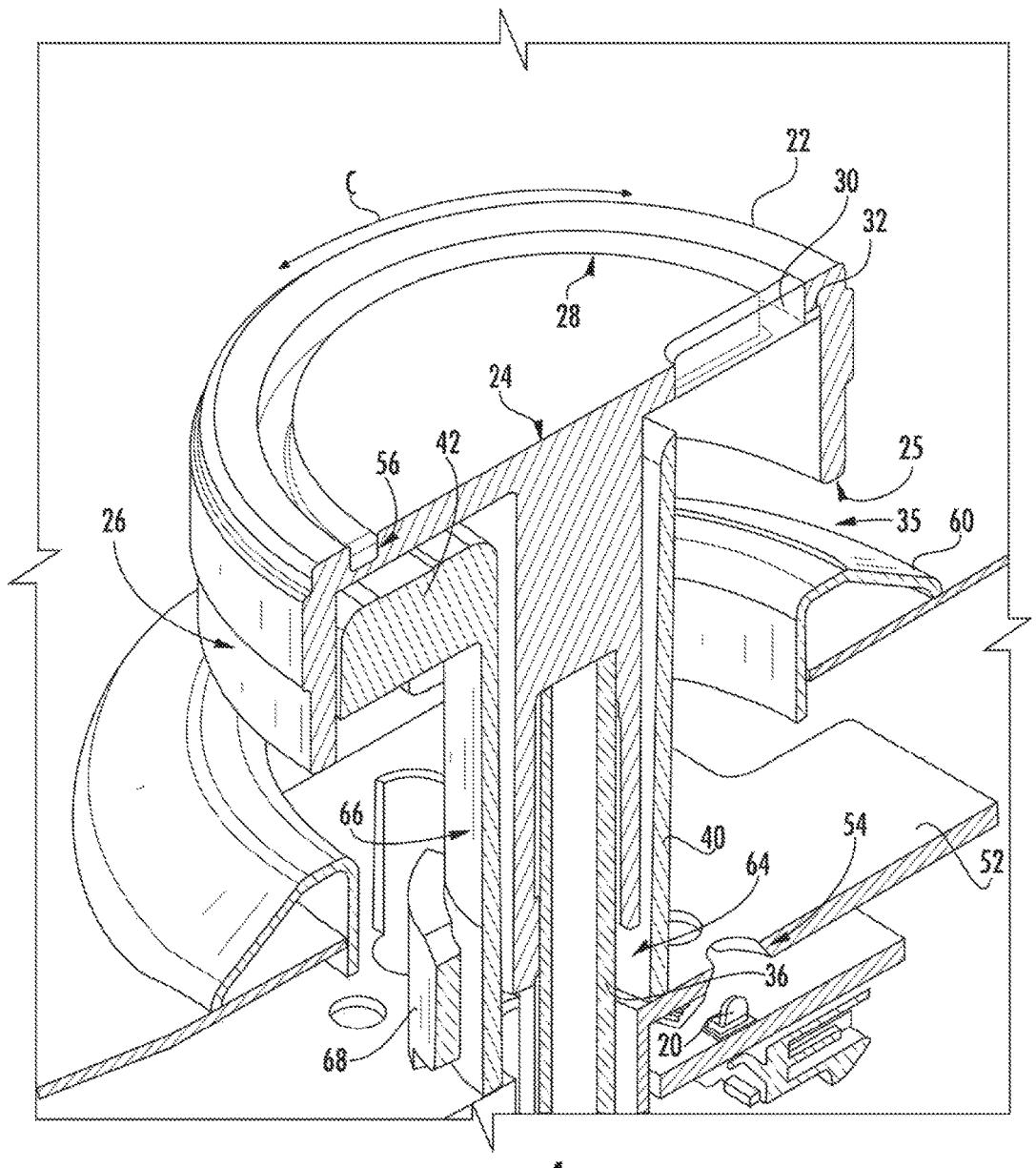
FIG. 4 provides a cross-sectional perspective view of the example knob assembly of FIG. 2 as mounted to an appliance.
Figure 5:
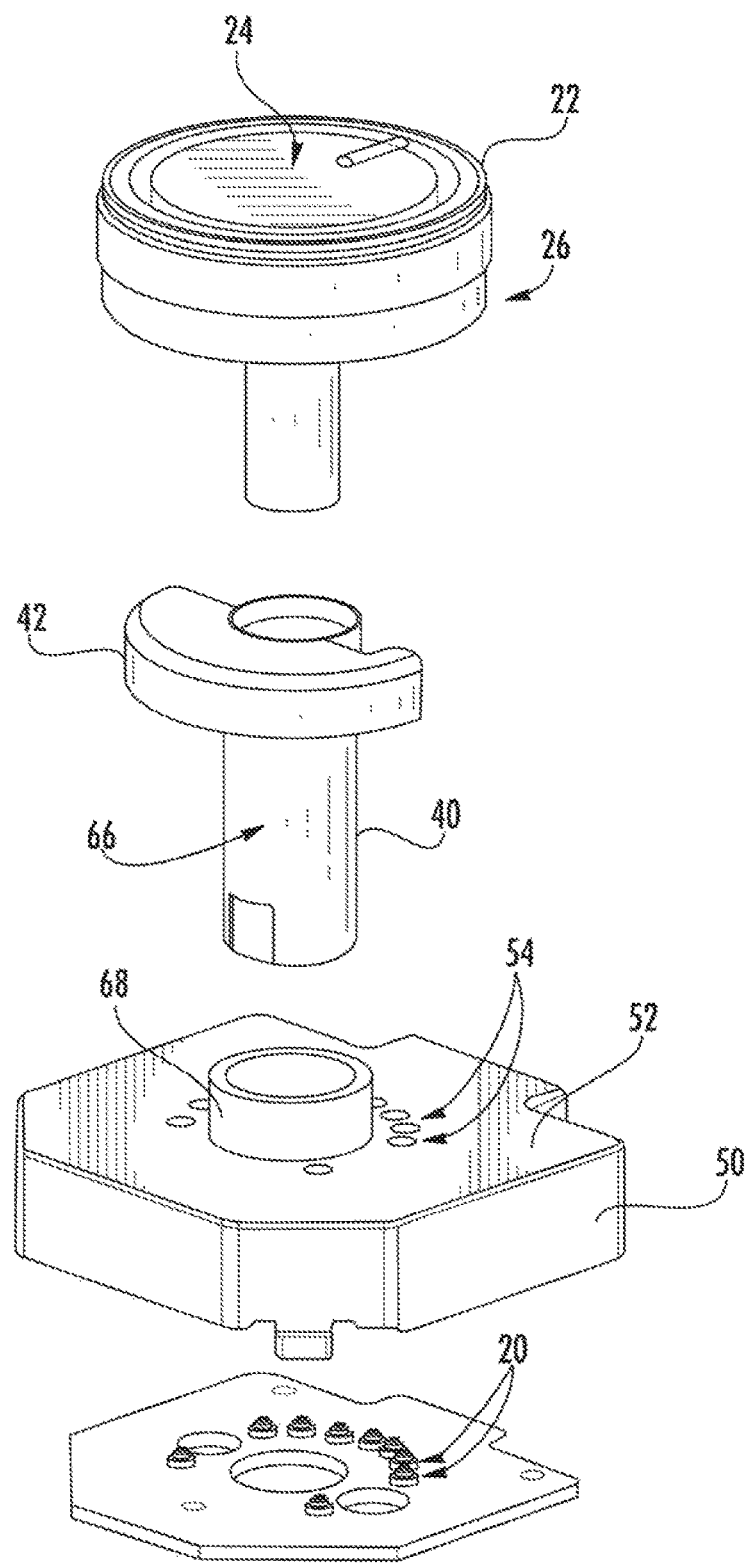
FIG. 5 provides an exploded perspective view of the example knob assembly of FIG. 2.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

Referring now to the figures, FIG. 1 illustrates an example embodiment of a cooking appliance 10, according to the present disclosure. Cooking appliance 10 generally defines a vertical direction V, a lateral direction L, and a transverse direction T. The vertical direction V, lateral direction L, and transverse direction T are each mutually perpendicular and form an orthogonal direction system.

Cooking appliance 10 may be, e.g., fitted integrally with a surface of a kitchen counter, or be a part of a range appliance. Cooking appliance 10 can include a chassis (not shown) and a cooktop surface 14 having one or more heating elements 18 for use in, e.g., heating or cooking operations. In one example embodiment, cooktop surface 14 is comprised of ceramic glass. In other embodiments, however, cooktop surface 14 may be comprised of another suitable material, such as a metallic material (e.g., steel) or another suitable non-metallic material. Heating elements 18 may be various sizes, as shown in FIG. 1, and may employ any suitable method for heating or cooking an object, such as a cooking utensil (not shown), and its contents. In one embodiment, for example, heating element uses a heat transfer method, such as electric coils or gas burners, to heat the cooking utensil. In another embodiment, however, heating element 18 uses an induction heating method to heat the cooking utensil directly. In turn, heating element may include a gas burner element, electric heat element, induction element, or another suitable heating element.

During use of cooking appliance 10, the amount of heat delivered by each heating element 18 on cooktop surface 14 is controlled by a corresponding controller 38 and control knob 22, as described in detail below. Knob 22, as used herein, refers to any configuration of dial, and not just one having a circular base shape, as shown in FIG. 1. For example, the present disclosure contemplates example embodiments wherein knobs 22 have a rectangular base shape, an ovular base shape, or any other shape having one or more curved lines, straight lines, or both.

Turning to FIGS. 2 through 5, an example knob assembly 12 is illustrated. In some embodiments, knob assembly 12 includes cooktop surface 14 defining an aperture 16. Cooktop surface 14, as used herein, refers to any surface of cooking appliance 10. For example, the present disclosure contemplates example embodiments where the entirety of cooktop surface 14 is comprised of a single suitable material and other embodiments where cooktop surface 14 is comprised of one material proximate to heating elements 18 (e.g., metal), and another material (e.g., plastic) proximate to control knob(s) 22.

Generally, control knob 22 is rotatably attached to cooktop surface 14. Specifically, control knob 22 is independently rotatable about a rotation axis A, e.g., relative to cooktop surface 14 and a stationary shutter 40. As shown, control knob 22 generally extends along rotation axis A, e.g., to couple with controller 38. In example embodiments, such as those shown, control knob 22 is mounted to a stem 36 extending through aperture 16 along the rotation axis A. Stem 36 may extend from controller 38. Controller 38 may thus be used to adjust the amount of heat delivered to heating element 18 according to the rotation of knob 22 and/or stem 36.

Optionally, rotation axis A may be parallel to the vertical direction V. Moreover, stem 36 and controller 38 may be formed as a single component. Alternatively, stem 36 may be a separate component from controller 38. For instance, stem 36 may, in one embodiment, be integrally formed with control knob 22. In yet another embodiment, stem 36 may be removably coupled to both control knob 22 and controller 38.

In some embodiments, controller 38 includes a memory and microprocessor, such as a general or special purpose microprocessor operable to execute programming instructions or micro-control code. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 38 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

In the embodiment shown, control knob 22 of knob assembly 12 includes a top surface 24 that defines a light-transmissive portion 28 (e.g., opening). Light-transmissive portion 28 is generally provided as a void extending entirely through control knob 22 along a direction parallel to the rotation axis A, e.g., the vertical direction V. A bottom surface 25 of control knob 22 may be spaced apart from top surface 24, e.g., relative to the rotation axis A and/or vertical direction V. Moreover, bottom surface 25 may extend circumferentially about rotation axis A to form a perimeter edge portion. A side surface 26 (e.g., radially outermost surface) of control knob 22 extends between top surface 24 and bottom surface 25. For instance, side surface 26 may extend along the rotation axis A from top surface 24 to bottom surface 25, e.g., as a radial extreme of control knob 22.

When assembled, control knob 22 is positioned above cooktop surface 14. An air gap 35 may be defined between bottom surface 25 and cooktop surface 14. The air gap 35 may be in fluid communication with aperture 16. In turn, aperture 16 may be in fluid communication with the ambient environment radially outward from control knob 22. Advantageously, air gap 35 may permit air to pass beneath cooktop surface 14, e.g., to cool and/or fuel one or more of heating elements 18 during operations thereof.

In example embodiments, knob assembly 12 includes a stationary shutter 40 positioned at aperture 16 in cooktop surface 14. For instance, stationary shutter 40 may be fixed to cooktop surface 14, e.g., by one or more adhesives or mechanical fasteners, such that stationary shutter 40 does not move relative to cooktop surface 14. Additionally or alternatively, stationary shutter 40 may be fixed to another member that is mounted at a fixed position relative to cooktop surface.

Stationary shutter 40 may include a flange 42 having an upper surface 44 and a lower surface 46. When assembled, upper surface 44 is positioned above lower surface 46 along the rotation axis A. At least of portion of flange 42, e.g., between upper surface 44 and lower surface 46, is generally opaque, e.g., such that light is not permitted to pass between upper surface 44 and lower surface 46. In turn, one or both of upper surface 44 and lower surface 46 may be comprised of an opaque material suitable to block light received from light source 20. Moreover, upper surface 44 and/or lower surface 46 may be formed to have a substantially rough or matte surface finish. Moreover, the circumferential portion of flange 42 between upper surface 44 and lower surface 46 may be formed to have a substantially rough or matte surface finish. Advantageously, the matte surface finish may minimize or restrict any light reflections therefrom. Flange 42, including upper surface 44 and lower surface 46, may be formed as a semi-circular body. Upper surface 44 and lower surface 46 extend about along a portion of a circumferential direction C defined about rotation axis A.

When assembled, stationary shutter 40 is positioned below control knob 22. Optionally, stationary shutter 40 may be radially bounded by control knob 22, e.g., at side surface 26 and/or bottom surface 25. Side surface 26 may form a cavity 48 in which stationary shutter 40 is positioned. During use, control knob 22 may thus independently rotate about and relative to stationary shutter 40. Moreover, as shown stationary shutter 40 may be axially spaced from control knob 22. Specifically, upper surface 44 of shutter 40 may be spaced relative to the rotation axis A from bottom surface 25 of control knob 22. In turn, control knob 22 may optionally translate along rotation axis A, e.g., as provided in a push-to-turn configuration.

As shown, a light source 20 is positioned below cooktop surface 14. Specifically, light source 20 is mounted below aperture 16 e.g., relative to the rotation axis A and/or vertical direction V. When assembled, light source 20 is aimed or directed toward aperture 16 such that light emissions from light source 20 may pass through aperture 16 during use. It is noted that although aperture 16 is illustrated as a void through which air and/or fluids may pass, alternative embodiments may be fluidly sealed, e.g., via one or more sealing O-rings or grommets. Aperture 16 may thus include a substantially transparent or translucent segment to permit the passage of light emissions therethrough.

During use, a least a portion of control knob 22 may receive at least a portion of light emissions projected from light source 20. Additionally or alternatively, lower surface 46 of stationary shutter 40 may receive at least a portion of light emissions projected from light source 20. In some embodiments, light source 20 includes one or more light-emitting diodes (LEDs). However, alternative embodiments of light source 20 may be provided as another suitable light-emitting structure. In optional embodiments, a plurality of light sources 20 may be disposed circumferentially about rotation axis A (e.g., such that each light source 20 is equally-spaced in a radial direction R from rotation axis A).

In some embodiments, a module cover 52 extends above light source 20, e.g., perpendicular to the rotation axis A. For instance, light source 20 may be housed within a module 50 that includes module cover 52. In some such embodiments, module 50 further houses controller 38 beneath light source 20. Module cover 52 defines a central opening 51 that is collinear with rotation axis A (e.g., to receive stem 36).

As shown, module 50, including module cover 52, is positioned below cooktop surface 14, such that module cover 52 is disposed between the cooktop surface 14 and light source 20 along the rotation axis A. Module cover 52 defines at least one guide channel 54. Specifically, module cover 52 may define a guide channel 54 having a channel diameter $D_C$ that extends parallel to the rotation axis A (e.g., along the vertical direction). Moreover, guide channel 54 is radially offset (i.e., separated along the radial direction R) from the rotation axis A such that guide channel 54 is defined a predetermined radial distance from rotation axis A. Guide channel 54 may further be radially offset from stationary shutter 40. Moreover, guide channel 54 may be circumferentially offset (i.e., separated along the circumferential direction C) from stationary shutter 40, as shown. In turn, guide channel 54 will not be vertically aligned with stationary shutter 40 when assembled.

In optional embodiments, guide channel 54 is collinear with light source 20 along an axis parallel to the rotation axis A. In example embodiments, a plurality of guide channels 54 are each defined at circumferential positions relative to rotation axis A. Moreover, each guide channel 54 may be positioned to correspond with a discrete light source 20.

As shown, light source 20 defines a projection diameter $D_P$ at guide channel 54. In certain embodiments, projection diameter $D_P$ may be greater than channel diameter $D_C$. Advantageously, guide channel 54 may sharpen or focus the light emissions directed from module cover 52 through aperture 16 to control knob 22.

In example embodiments, such as those shown in FIGS. 2 through 5, knob assembly 12 includes a lens 30 positioned above light source 20. Optionally, lens 30 may be positioned on control knob 22. Moreover, lens 30 may be disposed above stationary shutter 40 relative to the rotation axis A. For instance, lens 30 may be positioned above bottom surface 25. As shown, lens 30 may be in alignment with light-transmissive portion 28 (e.g., such that light may pass therebetween). In some such embodiments, lens 30 includes an extended portion 32 that extends into light-transmissive portion 28 along the rotation axis A. In turn, lens 30 extends through at least a portion of light-transmissive portion 28. In optional embodiments, a top surface 34 of extended portion 32 is substantially flush with top surface 24 of control knob 22. In other embodiments, however, top surface 34 of extended portion 32 may extend above top surface 24 of control knob 22 along vertical direction V.

When assembled, lens 30 has a generally arcuate shape. For instance, the shape of lens 30 may be matched to that of light-transmissive portion 28. Additionally or alternatively, lens 30 may be shaped as a circular ring or loop (e.g., as a toroid having a rectangular cross section). It is noted that embodiments wherein lens 30 is shaped as a toroid, extended portion 32 may extend below the toroidal body. As shown, top surface 24 of control knob 22 may define a circular groove 56, e.g., along the same circumferential direction C as light-transmissive portion 28. Groove 56 may further extend from top surface 24 in a direction parallel to the rotation axis A (e.g., the vertical direction V) without completely passing through control knob 22. At least a portion of lens 30 may be housed within groove 56.

Lens 30, including extended portion 32, may be made from any suitable transparent or translucent material, such as glass or plastic. Optionally, lens 30 may be formed from a uniform translucent material, such as a cast white acrylic or polycarbonate. Additionally or alternatively, a translucent coating or film may be applied to lens 30, e.g., at top surface 34.

Knob assembly 12 may also include a bezel 60 positioned between upper surface 44 of stationary shutter 40 and cooktop surface 14 along the rotation axis A. Bezel 60 may generally extend above cooktop surface 14 above aperture 16. Optionally, bezel 60 may define at least a portion of the air gap 35. Bezel 60 may be made from any suitable material, including metals and plastics.

As noted above, stationary shutter 40 is rotationally fixed relative to control knob 22. In some embodiments, stationary shutter 40 includes a shaft 62, e.g., to support flange 42. As shown, shaft 62 may extend along the rotation axis A. Shaft 62 extends through cooktop surface 14 at aperture 16. When assembled, flange 42 is held above cooktop surface 14 while another portion of shaft 62 extends below cooktop surface 14. Specifically, flange 42 may extend radially outward from shaft 62, e.g., within a cavity 48 defined by control knob 22. In the illustrated embodiments, shaft 62 is fixed to module cover 50. For instance, shaft 62 may be received by a collar 68 disposed on module cover 52. In alternative embodiments, one or more adhesives or mechanical fasteners may secure shaft 62 to cooktop surface 14 or another stationary component below cooktop surface 14.

Shaft 62 may define an internal passage 64, e.g., collinear with rotation axis A and/or aperture 16. Stem 36 and/or a segment of control knob 22 may extend through internal passage 64. In turn, stem 36 and/or a segment of control knob 22 may rotate within shaft 62, i.e., relative thereto. Light source 20 or guide channel 54 may be positioned radially outward from shaft 62. For instance, one or both of light source 20 and guide channel 54 may be positioned further in the radial direction R than an outer surface 66 of shaft 62. As shown, outer surface 66 of shaft 62 may be formed as a generally cylindrical surface (e.g., substantially orthogonal to the rotation axis A). As used herein, "substantially" is understood to mean within 10°. In optional embodiments, the outer surface 66 of shaft 62 is a polished reflective surface. For instance, outer surface 66 may have a high-polish or glossy finish that substantially reflects light projected thereon. During use, light emissions that strike the outer surface 66 of shaft 62 may thus be directed to control knob 22 (e.g., to the cavity 48 defined by control knob 22) and away from the air gap 35. Advantageously, light leakage from the air gap 35 may thereby be restricted.

Figure 6:
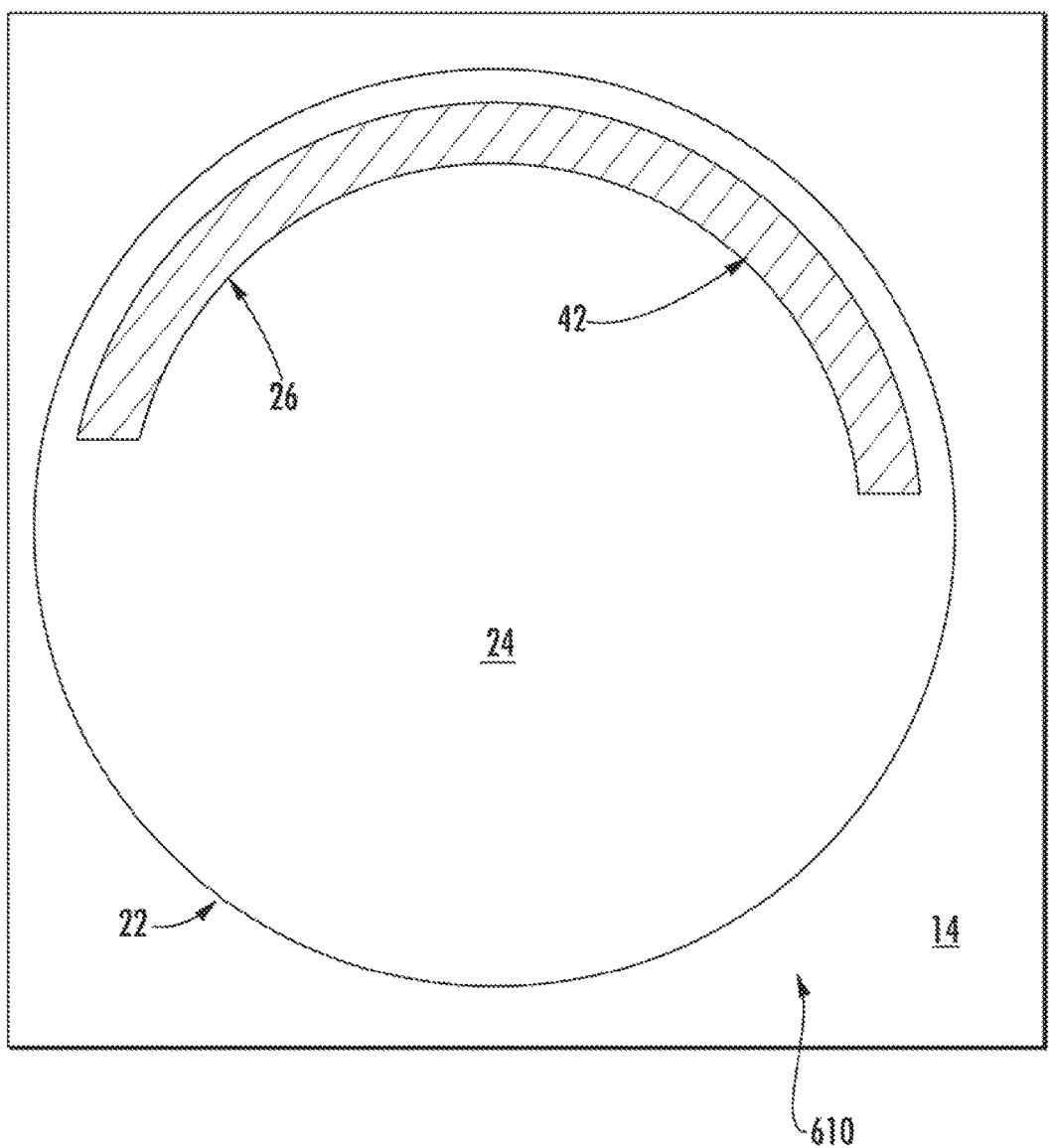
FIG. 6 provides a plan view of a knob assembly in a first position according to example embodiments of the present disclosure.

Referring now to FIGS. 2 through 8, control knob 22 may rotatable about the rotation is between a first position and a second position. As shown in FIG. 6, in the first position 610, light-transmissive portion 28 is circumferentially aligned with flange 42 of shutter 40 to restrict light therethrough. In other words, light-transmissive portion 28 of control knob 22 is positioned entirely and directly over flange 42 of shutter 40 (e.g., along the vertical direction V). As such, since light-transmissive portion 28 is positioned entirely over flange 42 in first position 610, light emitted by light source 20 cannot illuminate light-transmissive portion 28 in first position 610. In some embodiments, first position 610 may correspond to an "off" position in which a heating element 18, controlled by control knob 22 via controller 38, delivers no heat.

Control knob 22 is rotatable from first position 610 shown in FIG. 6 to other positions described below in more detail. Further, since control knob 22 is independently rotatable relative to shutter 40, position of light-transmissive portion 28 relative to upper surface 44 and/or lower surface 46 of flange 42 may vary as control knob 22 rotates about rotation axis A. More specifically, position of light-transmissive portion 28 relative to upper surface 44 and/or lower surface 46 may vary such that light-transmissive portion 28 is no longer positioned entirely over flange 42.

Figure 8:
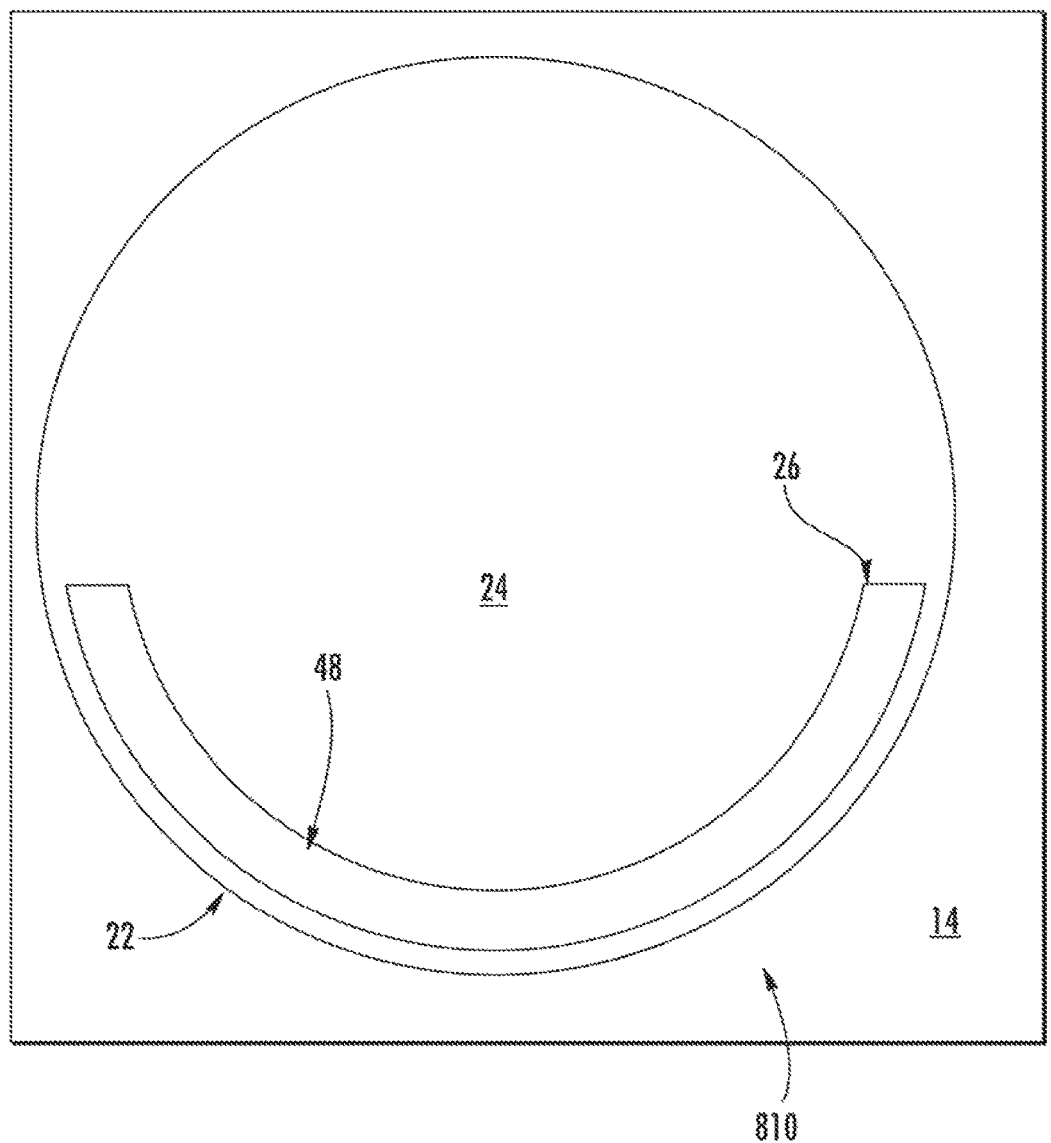
FIG. 8 provides a plan view of the example knob assembly of FIG. 6, wherein the knob assembly is in a second position.

Referring now to FIG. 8, control knob 22 is shown in a second position 810 in which light-transmissive portion 28 of control knob 22 circumferentially offset from flange 42 of shutter 40 to permit light from the light source 20 to pass through light-transmissive portion 28. In other words, light-transmissive portion 28 is positioned directly over the circumferential region of cavity 48 not covered by flange 42 (e.g., along vertical direction V. As such, since light-transmissive portion 28 is positioned entirely away from flange 42 in second position 810, light emitted by light source 20 illuminates light-transmissive portion 28 in second position 810. In some embodiments, second position 810 may correspond to a "fully on" position in which heating element 18, controlled by control knob 22 via controller 38, delivers a maximum amount of heat.

Figure 7:
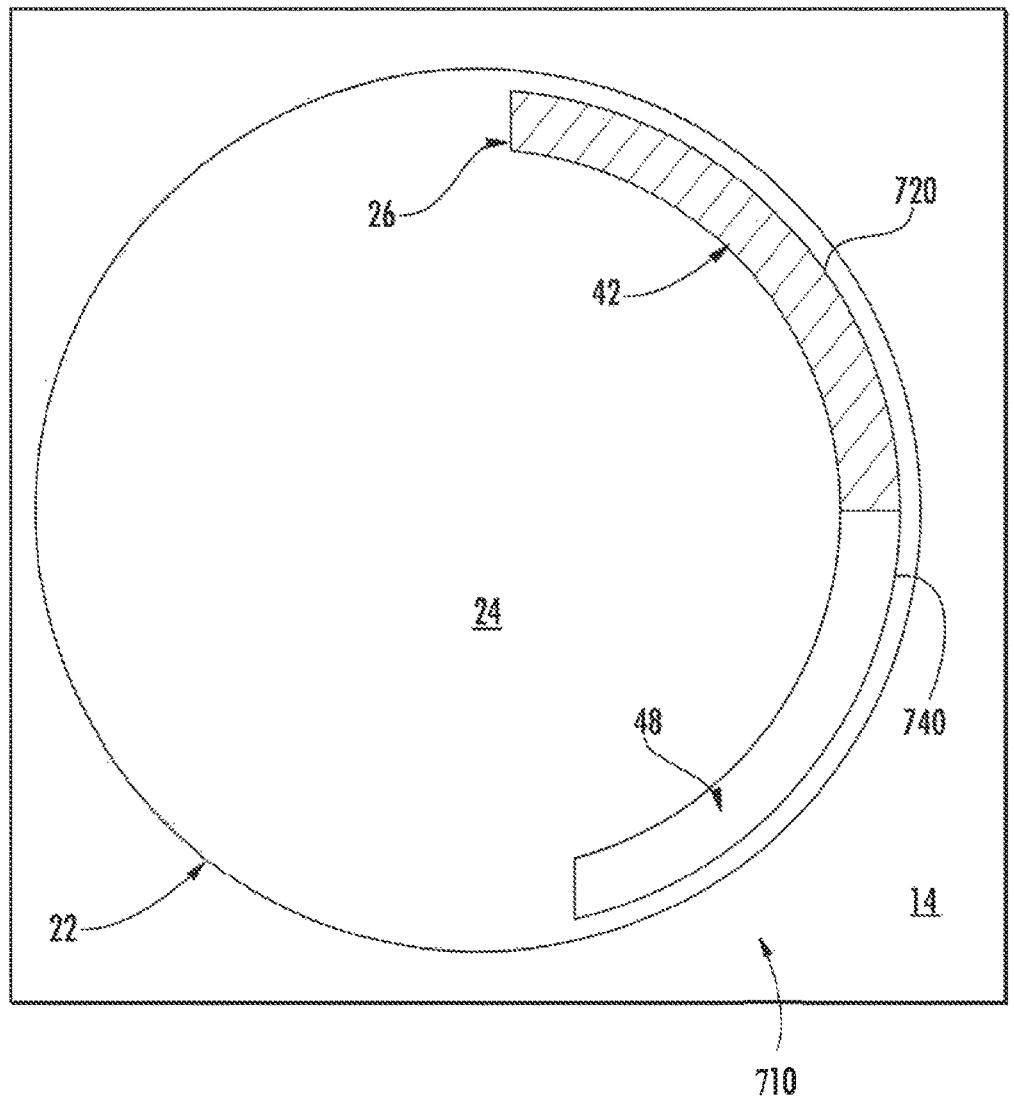
FIG. 7 provides a plan view of the example knob assembly of FIG. 6, wherein the knob assembly is in an intermediate third position.

Still further, as shown in FIG. 7, control knob 22 is rotatable to an intermediate third position 710 in which a first segment 720 of light-transmissive portion 28 is circumferentially aligned with flange 42 of shutter 40, and a second segment 740 of the light-transmissive portion 28 is circumferentially offset from flange 42 of shutter 40. In other words, first segment 720 of light-transmissive portion 28 is positioned over flange 42 (e.g., along vertical direction V), and second segment 740 of light-transmissive portion 28 is positioned over the circumferential region of cavity 48 not covered by flange 42. Intermediate third position 710 may be encountered during rotation of control knob 22 between first position 610 and second position 810. As such, since, in intermediate third position 710, only first segment 720 of light-transmissive portion 28 is circumferentially aligned with shutter 40, light emitted by light source 20 illuminates only second segment 740 of light-transmissive portion 28. In some embodiments, intermediate third position 710 may correspond to a "partially on" position in which heating element 18, controlled by control knob 22 via controller 38, delivers an amount of heat that is less than the maximum amount of heat that corresponds to the "fully on" position discussed above.

Although FIG. 7 shows intermediate third position 710 as being halfway between first and second positions 610 and 810, it is understood that intermediate third position 710 may correspond to any number of intermediate third positions between first and second positions 610 and 810. As an example, control knob 22 may be rotated to an intermediate third position 710 in which seventy-five percent of light-transmissive portion 28 is circumferentially offset from flange 42, and the remaining twenty-five percent of light-transmissive portion 28 is circumferentially aligned with flange 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knob assembly for an appliance, the knob assembly comprising:
   a surface defining an aperture;
   a stationary shutter fixed relative to the surface;
   a light source positioned below the surface, the light source being directed toward the aperture; and
   a control knob defining a light-transmissive portion above the surface, the control knob being disposed above the stationary shutter and independently rotatable relative to the aperture, the control knob being rotatable about a rotation axis between a first position and a second position, the first position including light-transmissive portion circumferentially aligned with the shutter to restrict light therethrough, and the second position including the light-transmissive portion circumferentially offset from the shutter to permit light from the light source to pass through the light-transmissive portion.

2. The knob assembly of claim 1, wherein the control knob is rotatable to an intermediate third position in which a first segment of the light-transmissive portion is circumferentially aligned with the shutter; and a second segment of the light-transmissive portion is circumferentially offset from the shutter.

3. The knob assembly of claim 1, wherein the shutter includes a shaft extending along the rotation axis to the surface.

4. The knob assembly of claim 3, wherein the shaft includes a polished reflective outer surface.

5. The knob assembly of claim 1, wherein the shutter includes and upper surface and a lower surface; and wherein the upper surface or lower surface includes a matte surface finish.

6. The knob assembly of claim 1, wherein at least a portion of the shutter is opaque to restrict light transmission to at least a portion of the control knob.

7. The knob assembly of claim 1, further comprising a lens positioned above the light source in alignment with the light-transmissive portion.

8. The knob assembly of claim 1, further comprising a module cover disposed between the surface and the light source along the rotation axis, the module cover defining a guide channel.

9. The knob assembly of claim 8, wherein the light source is collinear with the guide channel along an axis parallel to the rotation axis.

10. The knob assembly of claim 8, wherein the guide channel is offset from the rotation axis and the shutter.

11. A cooktop appliance, comprising:
a cooktop surface defining an aperture;
a burner disposed within the cooktop surface; and
a knob assembly, comprising
a stationary shutter fixed relative to the cooktop surface,
a light source positioned below the cooktop surface, the light source being directed toward the aperture, and
a control knob defining a light-transmissive portion above the cooktop surface, the control knob being disposed above the stationary shutter and independently rotatable relative to the aperture, the control knob being rotatable about a rotation axis between a first position and a second position, the first position including light-transmissive portion circumferentially aligned with the shutter to restrict light therethrough, and the second position including the light-transmissive portion circumferentially offset from the shutter to permit light from the light source to pass through the light-transmissive portion.

12. The cooktop appliance of claim 11, wherein the control knob is rotatable to an intermediate third position in which a first segment of the light-transmissive portion is circumferentially aligned with the shutter, and a second segment of the light-transmissive portion is circumferentially offset from the shutter.

13. The cooktop appliance of claim 11, wherein the shutter includes a shaft extending along the rotation axis to the cooktop surface.

14. The cooktop appliance of claim 13, wherein the shaft includes a polished reflective outer surface.

15. The cooktop appliance of claim 11, wherein the shutter includes and upper surface and a lower surface, and wherein the upper surface or lower surface includes a matte surface finish.

16. The cooktop appliance of claim 11, wherein at least a portion of the shutter is opaque to restrict light transmission to at least a portion of the control knob.

17. The cooktop appliance of claim 11, further comprising a lens positioned above the light source in alignment with the light-transmissive portion.

18. The cooktop appliance of claim 11, further comprising a module cover disposed between the cooktop surface and the light source along the rotation axis, the module cover defining a guide channel.

19. The cooktop appliance of claim 18, wherein the light source is collinear with the guide channel along an axis parallel to the rotation axis.

20. The cooktop appliance of claim 18, wherein the guide channel is offset from the rotation axis and the shutter.

* * * * *